(12) United States Patent
Park

(10) Patent No.: US 11,482,210 B2
(45) Date of Patent: Oct. 25, 2022

(54) ARTIFICIAL INTELLIGENCE DEVICE CAPABLE OF CONTROLLING OTHER DEVICES BASED ON DEVICE INFORMATION

(71) Applicant: LG ELECTRONICS INC., Seoul (KR)

(72) Inventor: Jisoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 285 days.

(21) Appl. No.: 16/498,130

(22) PCT Filed: May 29, 2019

(86) PCT No.: PCT/KR2019/006441
§ 371 (c)(1),
(2) Date: Sep. 26, 2019

(87) PCT Pub. No.: WO2020/241920
PCT Pub. Date: Dec. 3, 2020

(65) Prior Publication Data
US 2021/0335344 A1    Oct. 28, 2021

(51) Int. Cl.
*G10L 15/10* (2006.01)
*G06K 9/62* (2022.01)
(Continued)

(52) U.S. Cl.
CPC ............ *G10L 15/10* (2013.01); *G06K 9/6262* (2013.01); *G10L 15/02* (2013.01); *G10L 15/16* (2013.01);
(Continued)

(58) Field of Classification Search
CPC ......... G10L 15/00; G10L 15/02; G10L 15/10; G10L 15/16; G10L 15/22; G10L 15/28;
(Continued)

(56) References Cited

U.S. PATENT DOCUMENTS 11,194,998 B2 * 12/2021 Koishida .................. G10L 17/04
2014/0142934 A1 * 5/2014 Kim ........................ G10L 15/22
704/226

(Continued)

FOREIGN PATENT DOCUMENTS

| KR | 10-1832648 B1 | 2/2018 |
| KR | 10-2018-0034637 A | 4/2018 |
| KR | 10-2019-0042903 A | 4/2019 |

*Primary Examiner* — Daniel C Washburn
*Assistant Examiner* — Sean E Serraguard
(74) *Attorney, Agent, or Firm* — Birch, Stewart, Kolasch & Birch, LLP

(57) ABSTRACT

An artificial intelligence device includes a microphone configured to receive a voice command of a user, a communication unit configured to wirelessly perform communication with a first slave artificial intelligence device and a second slave artificial intelligence device, and a processor configured to acquire an intention of the voice command and determine a device which will perform operation corresponding to the intention based on the acquired intention and information on each of the artificial intelligence device, the first slave artificial intelligence device and the second slave artificial intelligence device.

8 Claims, 9 Drawing Sheets

(51) Int. Cl.
  *G10L 15/02* (2006.01)
  *G10L 15/16* (2006.01)
  *G10L 15/18* (2013.01)
  *G10L 15/22* (2006.01)

(52) U.S. Cl.
  CPC .......... *G10L 15/1815* (2013.01); *G10L 15/22* (2013.01); *G10L 2015/223* (2013.01)

(58) Field of Classification Search
  CPC ..... G10L 15/30; G10L 15/32; G10L 15/1815; G10L 2015/223; G06K 9/00; G06K 9/6262
  See application file for complete search history.

(56) References Cited

U.S. PATENT DOCUMENTS

| | | | |
|---|---|---|---|
| 2016/0155443 A1* | 6/2016 | Khan | G06F 1/3203 704/275 |
| 2017/0025124 A1 | 1/2017 | Mixter et al. | |
| 2017/0092270 A1* | 3/2017 | Newendorp | H04N 21/4394 |
| 2017/0330564 A1 | 11/2017 | Daley et al. | |
| 2018/0027127 A1* | 1/2018 | Mese | H04W 4/80 455/420 |
| 2018/0342151 A1* | 11/2018 | VanBlon | G06F 3/167 |
| 2019/0051289 A1 | 2/2019 | Yoneda et al. | |
| 2019/0238983 A1* | 8/2019 | Torok | H04R 27/00 |

\* cited by examiner

FIG. 7

- Air conditioner

| Device type | Action | Status | reword |
|---|---|---|---|
| Air conditioner | Turn off | OPTIMAL TEMPERATURE < CURRENT TEMPERATURE | 0 |
| Air conditioner | Turn off | OPTIMAL TEMPERATURE > CURRENT TEMPERATURE | 1 |
| Air conditioner | Turn on | OPTIMAL TEMPERATURE > CURRENT TEMPERATURE | 0 |
| Air conditioner | Turn on | OPTIMAL TEMPERATURE < CURRENT TEMPERATURE | 1 |

| Device type | Action | Status | reword |
|---|---|---|---|
| TV | Turn off | ADVERTISEMENT IS BEING PLAYED BACK | 2 |
| TV | Turn off | PROGRAM IS BEING PLAYED BACK | 1 |
| TV | Turn on | ADVERTISEMENT IS BEING PLAYED BACK | -1 |
| TV | Turn on | PROGRAM IS BEING PLAYED BACK | -1 |

FIG. 9

- Robot Cleaner

| Device type | Action | Status | reword |
|---|---|---|---|
| Robot Cleaner | Turn off | CLEANING PROGRESS RATE > 80% | 1 |
| Robot Cleaner | Turn off | CLEANING PROGRESS RATE < 80% | 0 |
| Robot Cleaner | Turn on | CLEANING PROGRESS RATE > 80% | -1 |
| Robot Cleaner | Turn on | CLEANING PROGRESS RATE < 80% | -1 |

FIG. 10

- Air Cleaner

| Device type | Action | Status | reword |
|---|---|---|---|
| Air Cleaner | Turn off | CONCENTRATION OF DUST < REFERENCE VALUE | 1 |
| Air Cleaner | Turn off | CONCENTRATION OF DUST > REFERENCE VALUE | 0 |
| Air Cleaner | Turn on | CONCENTRATION OF DUST < REFERENCE VALUE | -1 |
| Air Cleaner | Turn on | CONCENTRATION OF DUST > REFERENCE VALUE | -1 |

FIG. 11

- Refrigerator

| Device type | Action | Characteristic | reword |
|---|---|---|---|
| Refrigerator | Turn off | Always on | -2 |
| Refrigerator | Turn off | Always on | -2 |
| Refrigerator | Turn on | Always on | -2 |
| Refrigerator | Turn on | Always on | -2 |

ACQUIRE DISTANCE BETWEEN UTTERANCE POINT OF USER AND EACH ARTIFICIAL INTELLIGENCE DEVICE(S1201)

ACQUIRE INTENTION OF VOICE COMMAND(S1203)

CALCULATE TOTAL REWARD OF EACH DEVICE BASED ON ACQUIRED DISTANCE AND INFORMATION ON EACH ARTIFICIAL INTELLIGENCE DEVICE(S1205)

ACQUIRE PRIORITY BASED ON CALCULATED TOTAL REWARD(S1207)

REWARD FOR TURN-OFF

| Device type | Reword based on Distance | Reword based on Status information | Reword based on Characteristic information | Total reword |
|---|---|---|---|---|
| Air conditioner (100-1) | 4.5 | OPTIMAL TEMPERATURE < CURRENT TEMPERATURE -> 0 | 1 | 5.5 |
| TV (100-2) | 4 | Program: 2 | 1 | 7 |
| Robot Cleaner (100-3) | 5 | Cleaning status < 80% -> 0 | 1 | 6 |
| Air Cleaner (100-4) | 3.5 | Cleaning status < 80% -> 0 | 1 | 4.5 |
| Refrigerator (100-5) | 1 | 0 | -2 Always on | -1 |

FIG. 14

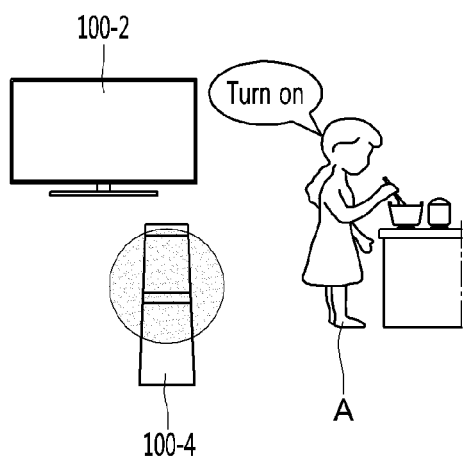

| Device type | Reword based on Distance | Reword based on user information | Total reword |
|---|---|---|---|
| TV | 4 | 2 | 6 |
| Air Cleaner | 5 | 0 | 5 |

| Device type | Reword based on Distance | Reword based on user information | Total reword |
|---|---|---|---|
| TV | 4 | 0 | 4 |
| Air Cleaner | 5 | 2 | 7 |

# ARTIFICIAL INTELLIGENCE DEVICE CAPABLE OF CONTROLLING OTHER DEVICES BASED ON DEVICE INFORMATION

CROSS REFERENCE TO RELATED APPLICATIONS

This application is the National Phase of PCT International Application No. PCT/KR2019/006441, filed on May 29, 2019, which is hereby expressly incorporated by reference into the present application.

TECHNICAL FIELD

The present invention relates to an artificial intelligence device capable of controlling other devices based on device information.

BACKGROUND ART

Competition for voice recognition technology which has started in smartphones is expected to become fiercer in the home with diffusion of the Internet of things (IoT).

In particular, an artificial intelligence (AI) device capable of issuing a command using voice and having a talk is noteworthy.

A voice recognition service has a structure for selecting an optimal answer to a user's question using a vast amount of database.

A voice search function refers to a method of converting input voice data into text in a cloud server, analyzing the text and retransmitting a real-time search result to a device.

The cloud server has a computing capability capable of dividing a large number of words into voice data according to gender, age and intonation and storing and processing the voice data in real time.

As more voice data is accumulated, voice recognition will be accurate, thereby achieving human parity.

Recently, a plurality of artificial intelligence devices capable of recognizing voice is present in a house.

In order to select an artificial intelligence device to be controlled by a user, an activation command for activating an artificial intelligence device needs to be uttered.

However, when a plurality of artificial intelligence devices is present in a house, the plurality of artificial intelligence devices is activated by an activation command uttered by a user. Therefore, there is a difficulty in selecting a device to be controlled by the user.

That is, when the user does not utter the name of a device, it is unclear which device is controlled.

Conventionally, technology of selecting an artificial intelligence device closest to a user was used. However, this may not be a device desired to be controlled by the user.

DISCLOSURE

Technical Problem

An object of the present invention is to provide an artificial intelligence device capable of selecting and controlling a device suitable for a voice command of a user in consideration of a distance between a user and the artificial intelligence device and status information of the artificial intelligence device when a plurality of artificial intelligence devices is present.

Technical Solution

An artificial intelligence device includes a microphone configured to receive a voice command of a user, a communication unit configured to wirelessly perform communication with a first slave artificial intelligence device and a second slave artificial intelligence device, and a processor configured to acquire an intention of the voice command and determine a device which will perform operation corresponding to the intention based on the acquired intention and information on each of the artificial intelligence device, the first slave artificial intelligence device and the second slave artificial intelligence device.

A method of operating an artificial intelligence device includes receiving a voice command of a user, acquiring an intention of the voice command, receiving information on a first slave artificial intelligence device and information on a second slave artificial intelligence device, and determining a device which will perform operation corresponding to the intention, based on the acquired intention and information on each of the artificial intelligence device, the first slave artificial intelligence device and the second slave artificial intelligence device.

Advantageous Effects

According to the embodiment of the present invention, it is possible to properly grasp a device to be controlled by the user through voice not only based on a distance between the utterance point of the user and each artificial intelligence device but also based on the status information and characteristic information of the artificial intelligence device.

According to the embodiment of the present invention, it is possible to solve a problem that an undesired device is controlled through a voice command.

DESCRIPTION OF DRAWINGS

FIGS. 7 to 11 are views illustrating reward tables indicating determined based on statuses or properties of a plurality of artificial intelligence devices with respect to one action.

FIG. 12 is a flowchart illustrating a process of acquiring priority based on information on artificial intelligence devices according to an embodiment of the present invention.

FIG. 13 is a view showing a process of calculating total rewards of devices based on information on artificial intelligence devices and acquiring priority of each device based on the total reward, according to an embodiment of the present invention.

FIGS. 14 and 15 are views illustrating an example of determining a device which will perform operation corresponding to a voice command based on user information according to an embodiment of the present invention.

BEST MODE

<Artificial Intelligence (AI)>

Figure 1:
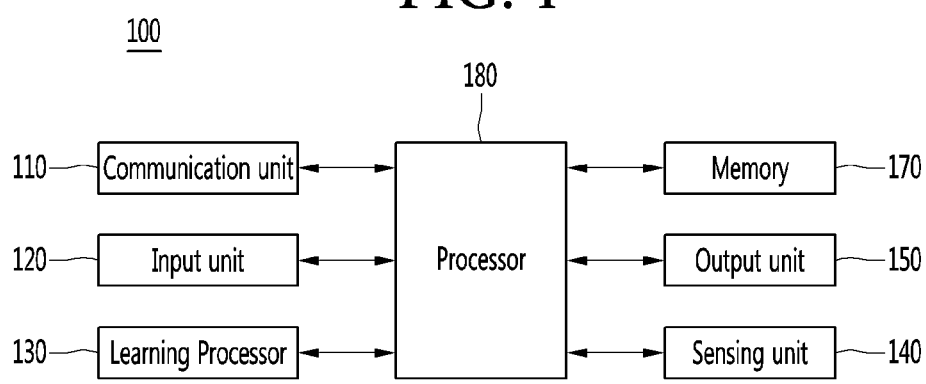
FIG. 1 is a view showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
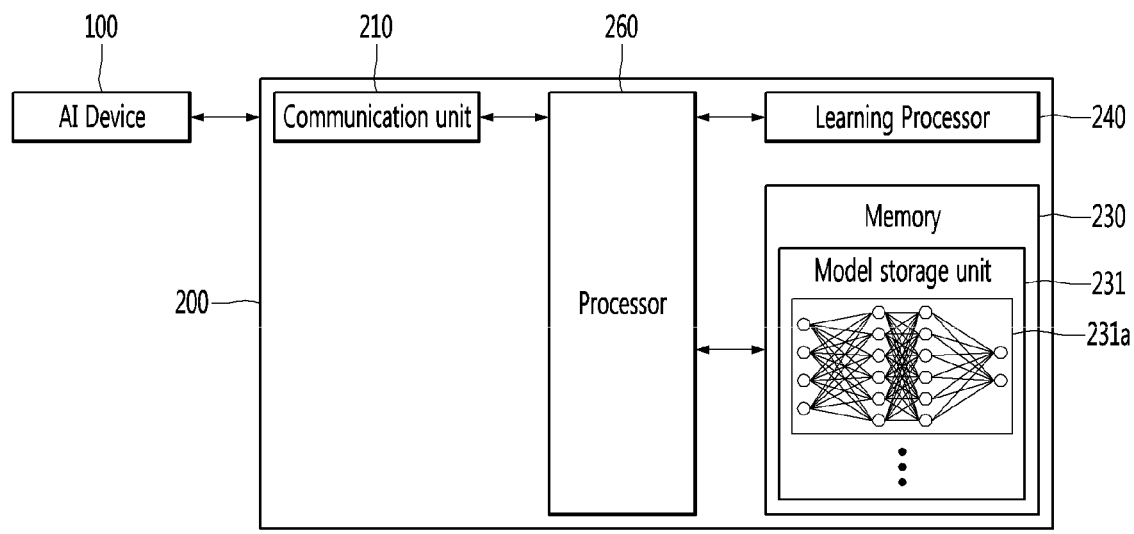
FIG. 2 is a view showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
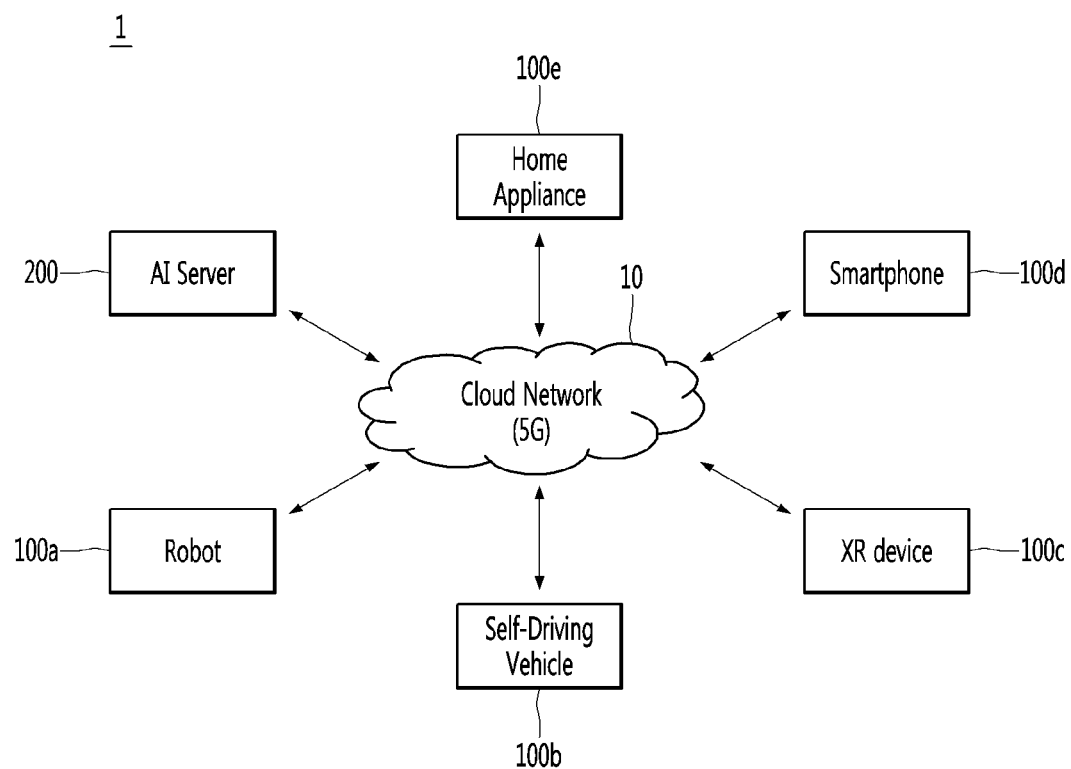
FIG. 3 is a view showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
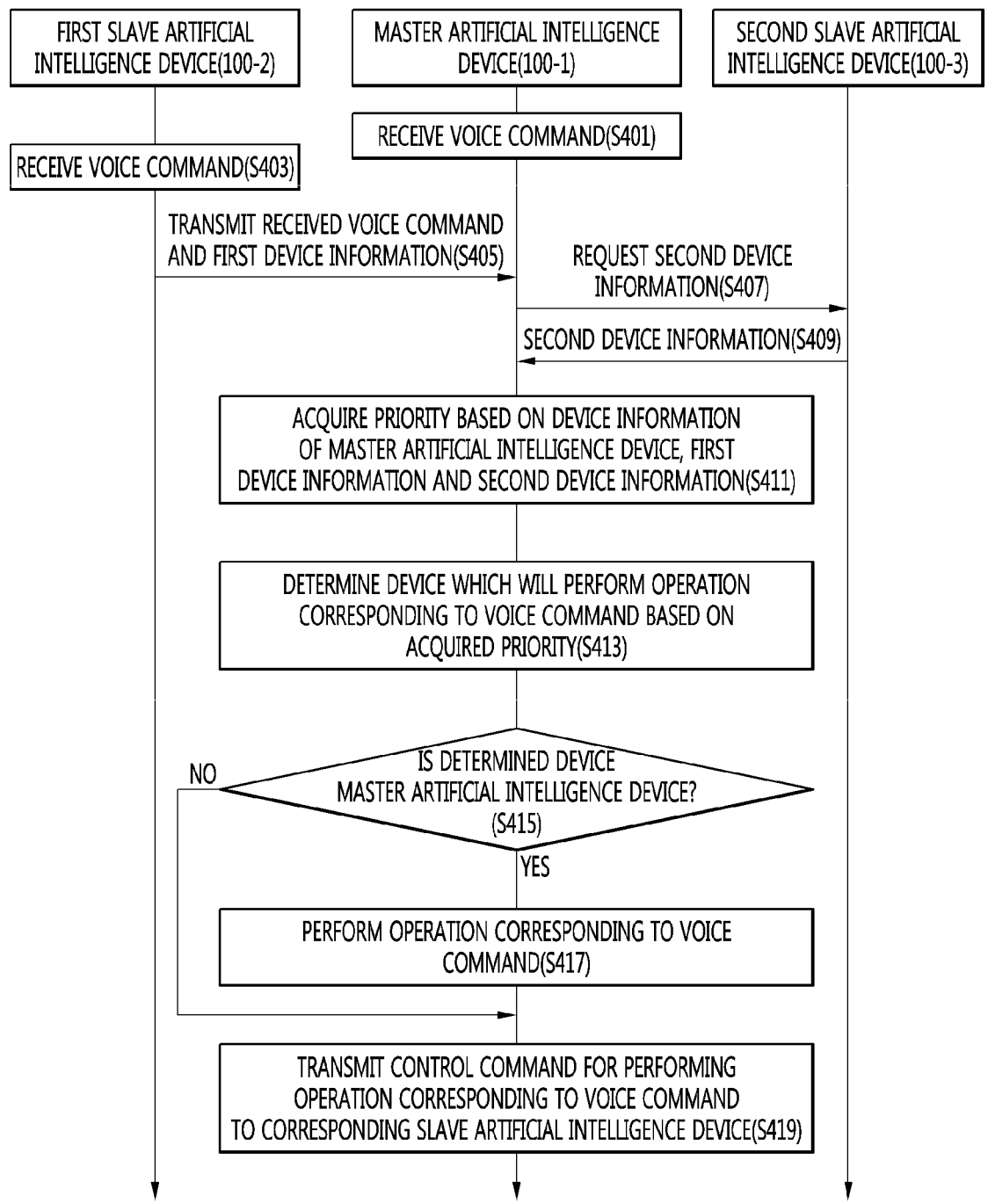
FIG. 4 is a ladder diagram illustrating a method of operating an artificial intelligence system according to an embodiment of the present invention.

FIG. 4 is a ladder diagram illustrating a method of operating an artificial intelligence system according to an embodiment of the present invention.

An artificial intelligence system may include a master artificial intelligence device 100-1, a first slave artificial intelligence device 100-2 and a second slave artificial intelligence device 100-3.

However, this is merely an example and the artificial intelligence system may include more slave artificial intelligence devices.

Each of the master artificial intelligence device 100-1, the first slave artificial intelligence device 100-2 and the second slave artificial intelligence device 100-3 may be the artificial intelligence device 100 shown in FIG. 1.

That is, each of the master artificial intelligence device 100-1, the first slave artificial intelligence device 100-2 and the second slave artificial intelligence device 100-3 may include all the components of the artificial intelligence device 100 shown in FIG. 1.

In one embodiment, the master artificial intelligence device 100-1 may have a largest number of artificial intelligence devices connected thereto.

The artificial intelligence devices may share the number of devices connected thereto each other through the communication unit 110, and the artificial intelligence device having a largest number of devices connected thereto may be selected as the master artificial intelligence device 100-1.

The master artificial intelligence device 100-1 may transmit, to the other artificial intelligence devices, a notification indicating that the artificial intelligence device 100-1 has been selected as a mater device authorized to control the other artificial intelligence devices.

First, the master artificial intelligence device 100-1 and the first slave artificial intelligence device 100-2 receive a voice command through the microphone (S401 and S403).

For example, the second slave artificial intelligence device 100-2 may be located at a position where the voice command uttered by a user cannot be received.

However, the present invention is not limited thereto. When the second slave artificial intelligence device 100-3 is located at a distance enough to receive the voice command of the user, the second slave artificial intelligence device 100-3 may also receive the voice command.

Meanwhile, the processor 180 of the master artificial intelligence device 100-1 may analyze the intention of the voice command using a natural language process (NLP) engine.

First, the processor 180 may convert voice data corresponding to the voice command into text data using a speech to text (STT) engine.

The processor 180 may analyze the intention of the converted text data using the NLP engine.

The intention of the text data may indicate specific operation of the artificial intelligence device.

Figure 5:
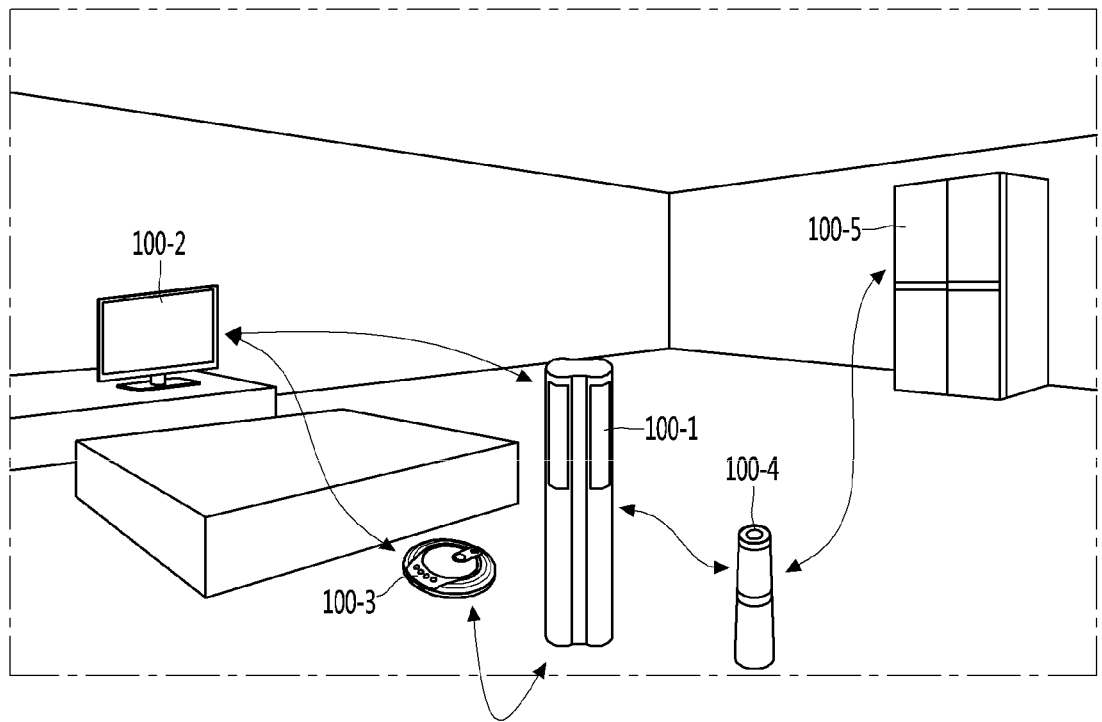
FIG. 5 is a view showing an example of selecting a master artificial intelligence device according to an embodiment of the present invention.

FIG. 5 is a view showing an example of selecting a master artificial intelligence device according to an embodiment of the present invention.

Referring to FIG. 5, the plurality of artificial intelligence devices 100-1 to 100-5 is provided in a house.

Each of the plurality of artificial intelligence devices 100-1 to 100-5 may identify an artificial intelligence device connected thereto through short-range wireless communication.

The short-range wireless communication standard may be Wi-Fi Direct, but this is merely an example. Each artificial intelligence device may include a Wi-Fi Direct module for short-range wireless communication.

The artificial intelligence devices may share the number of artificial intelligence devices connected thereto with each other.

The first artificial intelligence device 100-1 may be connected with the second artificial intelligence device 100-2, the third artificial intelligence device 100-3 and the fourth artificial intelligence device 100-4 and may have a largest number of devices connected thereto as compared to the other artificial intelligence devices.

Therefore, the first artificial intelligence device 100-1 may select itself as the master artificial intelligence device and notify the other artificial intelligence devices 100-2 of 100-5 that the first artificial intelligence device 100-1 is selected as the master artificial intelligence device.

FIG. 4 will be described again.

The communication unit 110 of the master artificial intelligence device 100-1 receives the voice command received by the first slave artificial intelligence device 100-2 from the first slave artificial intelligence device 100-2 and first device information of the first slave artificial intelligence device 100-2 (S405).

Since the first slave artificial intelligence device 100-2 serves as the slave device, the first slave artificial intelligence device 100-2 may transmit the received voice command and the first device information as device information thereof to the master artificial intelligence device 100-1.

The first device information may include at least one of identification information for identifying the first slave artificial intelligence device 100-2, status information indicating the current status of the first slave artificial intelligence device 100-2, or characteristic information of the first slave artificial intelligence device 100-2.

The identification information may include the product name, model name, etc. of the first slave artificial intelligence device 100-2.

The status information may include operation information indicating the operation status of the first slave artificial intelligence device 100-2. For example, when the first slave artificial intelligence device 100-2 is a robot cleaner, the status information may include a cleaning progress status of the robot cleaner. The characteristic information may include information indicating the unique characteristics of the first slave artificial intelligence device 100-2. For example, when the first slave artificial intelligence device 100-2 is a refrigerator, the characteristic information may indicate that the refrigerator is always turned on.

Meanwhile, the master artificial intelligence device 100-1 may receive a distance between the first slave artificial intelligence device 100-2 and a point where the user utters the voice command from the first slave artificial intelligence device 100-2.

The first device information may include the distance between the first slave artificial intelligence device 100-2 and the point where the user utters the voice command.

The communication unit 110 of the master artificial intelligence device 100-1 requests second device information from the second slave artificial intelligence device 100-3 (S407), and receives the second device information from the second slave artificial intelligence device 100-3 (S409).

The master artificial intelligence device 100-1 may transmit a message for requesting device information from a device which does not transmit the device information within a certain time among the slave artificial intelligence devices connected thereto.

The certain time may be within 0.5 seconds from the time when the master artificial intelligence device 100-1 receives the voice command, but this is merely an example.

The second device information may include at least one of identification information for identifying the second slave artificial intelligence device 100-3, operation information indicating the operation status of the second slave artificial intelligence device 100-3 or the characteristic information of the second slave artificial intelligence device 100-3.

In another example, the second slave artificial intelligence device 100-3 may also receive the voice command, and transmit the received voice command to the master artificial intelligence device 100-1 along with the second device information.

Meanwhile, the master artificial intelligence device 100-1 may receive a distance between the second slave artificial intelligence device 100-3 and the point where the user utters the voice command from the second slave artificial intelligence device 100-3.

The second device information may include the distance between the second slave artificial intelligence device 100-3 and the point where the user utters the voice command.

The processor 180 of the master artificial intelligence device 100-1 acquires priorities of the devices based on the device information thereof, the first device information and the second device information (S411).

In one embodiment, the priority may indicate the order of the device which will perform operation corresponding to the voice command of the user.

The processor 180 of the master artificial intelligence device 100-1 may give a reword point to each device and acquire priority of each device through the given reward point, based on the device information thereof, the first device information and the second device information.

The processor 180 may acquire the priorities of the devices based on the intention of the voice command, the device information thereof, the first device information and the second device information.

In another example, the processor 180 may acquire the priorities of the devices, based on the distance between the utterance position of the user and each artificial intelligence device, the device information of the master artificial intelligence device 100-1, the first device information and the second device information.

The processor 180 may determine the priorities of the devices, according to a reward based on the distance, a reward based on the status information of each artificial intelligence device, and a reward based on the characteristic information of each artificial intelligence device.

The processor 180 of the master artificial intelligence device 100-1 determines a device which will perform operation corresponding to the voice command based on the acquired priorities (S413).

The processor 180 of the master artificial intelligence device 100-1 may determine a device having highest priority among the priorities of the devices as a device for performing operation.

This will be described in detail with reference to the following drawings.

Figure 6:
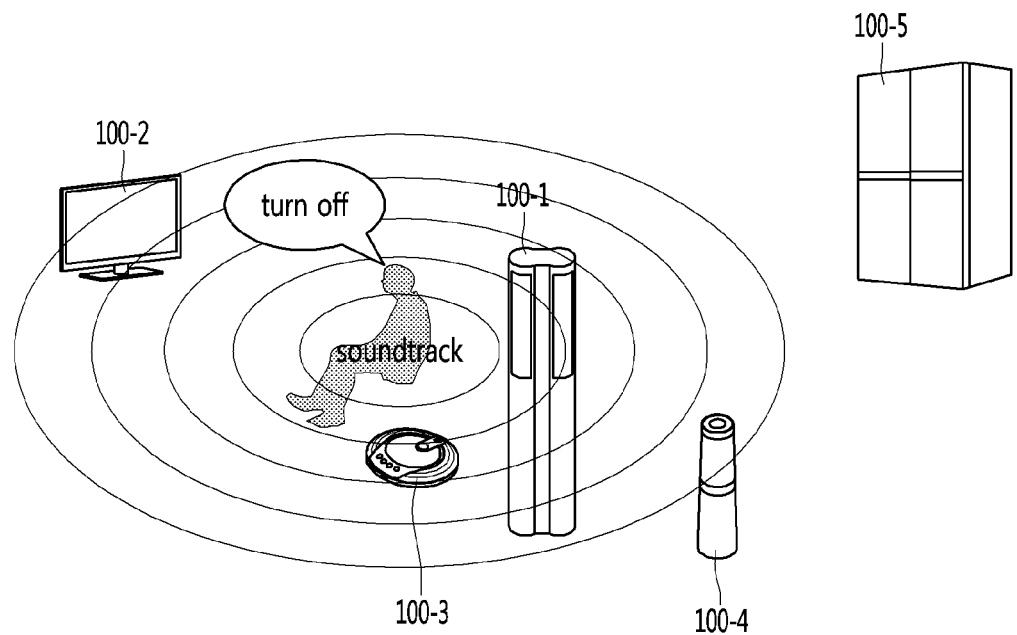
FIG. 6 is a view showing a status in which a plurality of artificial intelligence devices is provided according to an embodiment of the present invention.

First, FIG. 6 is a view showing a state in which a plurality of artificial intelligence devices is provided according to an embodiment of the present invention.

Referring to FIG. 6, the plurality of artificial intelligence devices 100-1 to 100-5 is provided around the user.

The user may utter the voice command <turn-off>.

The master artificial intelligence device 100-1 may analyze the intention of the voice command and determine a device which will perform operation suiting the intention among the plurality of artificial intelligence devices 100-1 to 100-5.

FIGS. 7 to 11 are views illustrating reward tables indicating determined based on statuses or characteristics of a plurality of artificial intelligence devices with respect to one action.

First, FIG. 7 is a view showing a reward determined based on the status of an air conditioner.

For action "turn-off", when a current temperature is greater than an optimal temperature, a reward of 0 may be given to the air conditioner. This may be because the air conditioner should continuously operate and should not be turned off.

For action "turn-off", when the current temperature is less than the optimal temperature, a reward of 1 may be given to the air conditioner. This may be because the purpose for operating the air conditioner is achieved and may be turned off.

For action "turn-on", when the current temperature is less than the optimal temperature, a reward of 0 may be given to the air conditioner. This may be because the purpose for operating the air conditioner is achieved and the turned-off state may be maintained.

For action "turn-on", when the current temperature is greater than the optimal temperature, a reward of 1 may be given to the air conditioner. This may be because the air conditioner should operate.

Next, FIG. 8 will be described.

FIG. 8 is a view showing a reward determined based on the playback state of a TV.

In FIG. 8, in particular, assume that content is played back in a state in which the TV is turned on.

Referring to FIG. 8, for action "turn-off", a reward of 2 may be given to the TV when an advertisement is played back on the TV and a reward of 1 may be given to the TV when a program is played back on the TV. This is because the user is more interested in the program than the advertisement.

Meanwhile, since the advertisement or the program is already being played back on the TV, action "turn-on" is interpreted as a meaningless action and a reward of −1 may be given to the TV.

Next, FIG. 9 will be described.

FIG. 9 is a view showing a reward determined based on a cleaning progress rate of a robot cleaner.

In FIG. 9, assume that the robot cleaner is turned on and cleaning is in progress.

Referring to FIG. 9, for action "turn-off", a reward of 1 may be given to the robot cleaner when the cleaning progress rate of the robot cleaner is greater than 80%, and a reward of 0 may be given to the robot cleaner when the cleaning progress rate of the robot cleaner is less than 80%.

This is because the robot cleaner should continuously perform cleaning when the cleaning progress rate of the robot cleaner is less than 80%.

Meanwhile, since the robot cleaner is performing cleaning, action "turn-on" is interpreted as a meaningless action and thus a reward of −1 may be given to the robot cleaner.

Next, FIG. 10 will be described.

FIG. 10 is a view showing a reward determined based on the status of an air cleaner.

In FIG. 10, assume that the air cleaner is turned on.

Referring to FIG. 10, for action "turn-off", a reward of 1 may be given to the air cleaner when the concentration of dust is less than a reference value and a reward of 0 may be given to the air cleaner when the concentration of dust is greater than the reference value.

This is because the purpose of the air cleaner is achieved when the concentration of dust is less than the reference value.

Meanwhile, since the air cleaner is performing ventilation, action "turn-on" is interpreted as a meaningless action and thus a reward of −1 may be given to the air cleaner.

Next, FIG. 11 will be described.

FIG. 11 is a view showing a reward determined based on the characteristics of a refrigerator.

The refrigerator may have an always-on feature.

Referring to FIG. 11, for action "turn-off"/"turn-on", a reward of −2 may be given to the refrigerator.

Since the refrigerator has the always-on feature, the refrigerator does not respond to action "turn-on/turn-off". Therefore, a minus reward may be given.

In one embodiment, such a reward may be given by the master artificial intelligence device 100-1.

The master artificial intelligence device 100-1 may store the reward tables shown in FIGS. 7 to 11 in the memory 170. The master artificial intelligence device 100-1 may receive the reward tables of FIGS. 7 to 11 from the slave artificial intelligence devices.

FIG. 12 is a flowchart illustrating a process of acquiring priority based on information on artificial intelligence devices according to an embodiment of the present invention.

Steps of FIG. 12 may be details of step S411 of FIG. 4.

Referring to FIG. 12, the processor 180 of the master artificial intelligence device 100-1 acquires a distance between the utterance point of the user and each artificial intelligence device (S1201).

The processor 180 may receive the distance between each slave device and the utterance point of the user from the slave artificial intelligence devices 100-2 and 100-3 through the communication unit 110.

The processor 180 may calculate the distance between the master artificial intelligence device 100-1 and the utterance point of the user through a distance measurement module (not shown). For example, the distance measurement module may measure the decibel of the received voice command.

The processor 180 may acquire a distance corresponding to the measured decibel. A plurality of decibels and distances corresponding thereto may be prestored in the memory 170.

The processor 180 may acquire a distance corresponding to the decibel measured by the distance measurement module from the memory 170.

In addition, each of the slave artificial intelligence devices 100-2 and 100-3 may acquire a distance between the utterance point of the user and each slave device in such a manner.

The processor 180 of the master artificial intelligence device 100-1 acquires the intention of the voice command using the natural language process engine (S1203).

The natural language process engine may convert voice data corresponding to the voice command into text data and acquire the intention of the voice command from the converted text data.

The natural language process engine may be included in the processor 180.

The processor 180 of the master artificial intelligence device 100-1 calculates the total reward of each artificial intelligence device based on the acquired distance, the intention of the voice command and information on each artificial intelligence device (S1205).

The processor 180 may calculate the total reward of each device, according to a reward based on the distance between each artificial intelligence device and the utterance point of the user, a reward based on the intention of the voice command and the status information of the artificial intelligence device, and a reward based on the intention of the voice command and the characteristic information of the artificial intelligence device.

The processor 180 of the master artificial intelligence device 100-1 acquires the priority of each device based on the calculated total reward (S1207).

FIG. 13 is a view showing a process of calculating total rewards of devices based on information on artificial intelligence devices and acquiring priority of each device based on the total reward, according to an embodiment of the present invention.

In FIG. 13, assume that the voice command uttered by the user is turn-off and the intention of turn-off is to turn off a device.

In addition, assume that the master artificial intelligence device 100-1 is an air conditioner and four slave devices 100-2 to 100-5 are respectively a TV, a robot cleaner, an air cleaner and a refrigerator.

The master artificial intelligence device 100-1 may give a reward to each device based on the distance between the point where the user utters the voice command and each device.

The master artificial intelligence device 100-1 may give a high reward as the distance between the utterance point of the user and each device decreases and give a low reward as the distance increases.

When the robot cleaner 100-2, the air conditioner 100-1, the TV 100-2, the air cleaner 100-4 and the refrigerator 100-5 are closer to the utterance point of the user in this order, high rewards may be given in this order of the devices.

A reward of 5 may be given to the robot cleaner 100-3 when the distance between the utterance point of the user and the robot cleaner 100-3 is 0.5 m, a reward of 4.5 may be given to the air conditioner 100-1 when the distance between the utterance point of the user and the air conditioner 100-1 is 1 m, a reward of 4 may be given to the TV 100-2 when the distance between the utterance point of the user and the TV 100-2 is 1.5 m, a reward of 3.5 may be given to the air cleaner 100-4 when the distance between the utterance point of the user and the air cleaner 100-4 is 2 m, and a reward of 1 may be given to the refrigerator 100-5 when the distance between the utterance point of the user and the refrigerator 100-5 is 4.5 m.

The master artificial intelligence device 100-1 may give the reward based on the intention of the voice command and the status information of each device.

For example, in the case of the air conditioner 100-1, when the current temperature is greater than an optimal temperature, a reward of 0 may be given to the air conditioner 100-1 in correspondence with the intention of turn-off. The reward may be given based on the reward table of FIG. 7.

The master artificial intelligence device 100-1 may give the reward based on the intention of the voice command and the characteristic information of each device.

The master artificial intelligence device 100-1 does not need to be always turned on, and may give a reward of 1 to the devices 100-1 to 100-2 which are turned on.

In addition, the master artificial intelligence device 100-1 may give a reward of −2 to the refrigerator 100-5 which needs to be always turned on.

The master artificial intelligence device 100-1 may calculate a sum of the reward based on the distance of each device, the reward based on the status information of each device and the reward based on the characteristic information of each device.

The air conditioner which is the master artificial intelligence device 100-1 may acquire a total reward of 4.5, the TV 100-2 may acquire a total reward of 7, the robot cleaner 100-3 may acquire a total reward of 6, the air cleaner 100-4 may acquire a total reward of 4.5, and the refrigerator may acquire a total reward of −1.

The master artificial intelligence device 100-1 may give higher priority to a device having a larger total reward.

That is, in S113, the master artificial intelligence device 100-1 may give highest priority to the TV 100-2 having a largest reward.

Thereafter, step S413 of FIG. 4 may be performed.

That is, the master artificial intelligence device 100-1 may determine the TV 100-2 having highest priority as a device which will perform operation corresponding to the voice command.

FIG. 4 will be described again.

The processor 180 of the master artificial intelligence device 100-1 determines whether the determined device is the master artificial intelligence device 100-1 (S415) and performs operation corresponding to the voice command when the determined device is the master artificial intelligence device 100-1 (S417).

When the master artificial intelligence device 100-1 has highest priority, the processor 180 may determine the master artificial intelligence device 100-1 as a subject which will perform operation corresponding to the voice command, and perform operation corresponding to the voice command.

When the determined device is any one of the first and second slave artificial intelligence devices 100-2 and 100-3, the processor 180 of the master artificial intelligence device 100-1 transmits a control command for performing operation corresponding to the voice command to the corresponding slave artificial intelligence device (S419).

The corresponding slave artificial intelligence device may receive the control command from the master artificial intelligence device 100-1 and perform operation according to the received control command.

That is, according to the example of FIG. 13, the processor 180 may transmit a control command for requesting turn-off to the TV which is the first slave artificial intelligence device 100-2.

The first slave artificial intelligence device 100-2 may be turned off according to the control command received from the master artificial intelligence device 100-1.

According to the embodiment of the present invention, it is possible to properly grasp a device to be controlled by the user through voice not only based on the distance between the utterance point of the user and each artificial intelligence device but also based on the status information and characteristic information of the artificial intelligence device.

Therefore, it is possible to solve a problem that an undesired device is controlled through the voice command.

Figure 15:
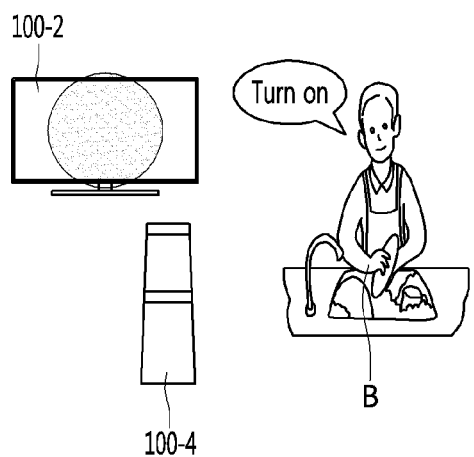

FIGS. 14 and 15 are views illustrating an example of determining a device which will perform operation corresponding to a voice command based on user information according to an embodiment of the present invention.

In FIGS. 14 and 15, assume that the master artificial intelligence device is a TV 100-2 and the slave artificial intelligence device is an air cleaner 100-4.

In addition, in FIGS. 14 and 15, assume that the voice command of the user is <turn-on>.

First, FIG. 14 will be described.

Referring to FIG. 14, a user A may utter a voice command <turn-on> during cooking. The TV 100-2 and the air cleaner 100-4 may receive the voice command through the microphone.

The TV 100-2 may acquire the distance between the TV and the user A based on the decibel of the received voice command. When the acquired distance is 1.5 m, the reward based on the distance may be 4.

The air cleaner 100-4 may measure the decibel of the received voice command and acquire a distance (0.5 m) between the air cleaner and the user A based on the measured decibel. The air cleaner 100-4 may transmit the acquired distance to the TV 100-2.

The TV 100-2 may give a reward of 5 to the air cleaner 100-4 based on the distance between the air cleaner 100-4 and the user A received from the air cleaner 100-4.

The TV 100-2 may give a reward of 2 to the TV 100-2 and give a reward of 0 to the air cleaner 100-4, when the number of times of turning on the TV 100-2 is greater than the number of times of turning on the air cleaner 100-4 in a state in which the distance between the user A and the device is in a range of 0 to 2 m.

The total reward of the TV 100-2 is 6 and the total reward of the air cleaner 100-4 is 5.

Therefore, the TV 100-2 may determine the TV itself as a subject which will perform operation corresponding to the voice command, even if the distance between the user A and the air cleaner 100-4 is shorter.

Next, FIG. 15 will be described.

Referring to FIG. 15, a user B may utter a voice command <turn-on> during cooking. The TV 100-2 and the air cleaner 100-4 may receive the voice command through the microphone.

The TV 100-2 may acquire the distance between the TV and the user B based on the decibel of the received voice command. When the acquired distance is 1.5 m, the reward based on the distance may be 4.

The air cleaner 100-4 may measure the decibel of the received voice command and acquire a distance (0.5 m) between the air cleaner and the user B based on the measured decibel. The air cleaner 100-4 may transmit the acquired distance to the TV 100-2.

The TV 100-2 may give a reward of 5 to the air cleaner 100-4 based on the distance between the air cleaner 100-4 and the user B received from the air cleaner 100-4.

The TV 100-2 may give a reward of 0 to the TV 100-2 and give a reward of 2 to the air cleaner 100-4, when the number of times of turning on the TV 100-2 is less than the number of times of turning on the air cleaner 100-4 in a state in which the distance between the user B and the device is in a range of 0 to 2 m.

The total reward of the TV 100-2 is 4 and the total reward of the air cleaner 100-4 is 7.

Therefore, the TV 100-2 may determine the air cleaner 100-4 as a subject which will perform operation corresponding to the voice command.

The present invention mentioned in the foregoing description can also be embodied as computer readable codes on a computer-readable recording medium. The computer-readable recording medium may include all types of recording devices in which data readable by a computer system is stored. Examples of computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. In addition, the computer may include the processor 180 of the artificial intelligence device.

The invention claimed is:

1. An artificial intelligence device comprising:
   a microphone configured to receive a voice command of a user;
   a communication unit configured to wirelessly perform communication with a slave artificial intelligence device; and
   a processor configured to;
   acquire an intention of the voice command,
   determine a device which will perform an operation corresponding to the intention based on the acquired intention,
   obtain a first distance between the artificial intelligence device and the user based on the voice command,
   receive a second distance between the slave artificial intelligence device and the user from the slave artificial intelligence device, and
   determine the artificial intelligence device as the device that will perform the operation corresponding to the voice command when a first number of times that the artificial intelligence device is turned on while being within a specific distance range away from the user is more than a second number of times that the slave artificial intelligence device is turned on while being within the specific distance range, although the first distance is greater than the second distance.

2. The artificial intelligence device according to claim 1, wherein the processor is further configured to:
   in response to determining that the first number is more than the second number, control the artificial intelligence device to perform the operation corresponding to the voice command.

3. The artificial intelligence device according to claim 1, wherein the processor is further configured to:
   in response to determining that the first number is less than the second number, transmit a control command for performing the operation corresponding to the voice command to the slave artificial intelligence device.

4. The artificial intelligence device according to claim 1, wherein the processor is further configured to:
   determine a first reward score for the artificial intelligence device based on the first distance,
   determine a second reward score for the artificial intelligence device based on frequency of use information of the artificial intelligence device,
   determine a third reward score for the slave artificial intelligence device based on the second distance,
   determine a fourth reward score for the artificial intelligence device based on frequency of use information of the slave artificial intelligence device,
   in response to a first sum of the first reward score and the second reward scored being greater than a second sum of the third reward score and the fourth reward score, control the artificial intelligence device to perform the operation corresponding to the voice command, and
   in response to the first sum being less than the second sum, transmit a control command for performing the operation corresponding to the voice command to the slave artificial intelligence device.

5. A method of operating an artificial intelligence device, the method comprising:
   receiving a voice command of a user;
   acquiring an intention of the voice command;

determining a device which will perform an operation corresponding to the intention, based on the acquired intention;

obtaining a first distance between the artificial intelligence device and the user based on the voice command;

receiving a second distance between the slave artificial intelligence device and the user from the slave artificial intelligence device; and determining the artificial intelligence device as the device that will perform the operation corresponding to the voice command when a first number of times that the artificial intelligence device is turned on while being within a specific distance range away from the user is more than a second number of times that the slave artificial intelligence device is turned on while being within the specific distance range, although the first distance is greater than the second distance.

6. The method according to claim 5, further comprising:
in response to determining that the first number is more than the second number, controlling the artificial intelligence device to perform the operation corresponding to the voice command.

7. The method according to claim 5, further comprising:
in response to determining that the first number is less than the second number, transmitting a control command for performing the operation corresponding to the voice command to the slave artificial intelligence device.

8. The method according to claim 5, further comprising:
determining a first reward score for the artificial intelligence device based on the first distance;

determining a second reward score for the artificial intelligence device based on frequency of use information of the artificial intelligence device;

determining a third reward score for the slave artificial intelligence device based on the second distance;

determining a fourth reward score for the artificial intelligence device based on frequency of use information of the slave artificial intelligence device;

in response to a first sum of the first reward score and the second reward scored being greater than a second sum of the third reward score and the fourth reward score, controlling the artificial intelligence device to perform the operation corresponding to the voice command; and in response to the first sum being less than the second sum, transmitting a control command for performing the operation corresponding to the voice command to the slave artificial intelligence device.

\* \* \* \* \*